(12) United States Patent
Shimura et al.

(10) Patent No.: US 9,288,426 B2
(45) Date of Patent: Mar. 15, 2016

(54) VIDEO DISPLAY CONTROL DEVICE

(71) Applicant: Panasonic Corporation, Osaka (JP)

(72) Inventors: Takuma Shimura, Osaka (JP); Terumitsu Suenaga, Kanagawa (JP); Takashi Akita, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 51 days.

(21) Appl. No.: 14/376,034

(22) PCT Filed: Jan. 17, 2013

(86) PCT No.: PCT/JP2013/000209
§ 371 (c)(1),
(2) Date: Jul. 31, 2014

(87) PCT Pub. No.: WO2013/114805
PCT Pub. Date: Aug. 8, 2013

(65) Prior Publication Data
US 2015/0042884 A1    Feb. 12, 2015

(30) Foreign Application Priority Data

Feb. 3, 2012    (JP) .................................. 2012-021922

(51) Int. Cl.
*G09G 3/36*    (2006.01)
*H04N 5/57*    (2006.01)
(Continued)

(52) U.S. Cl.
CPC ............... *H04N 5/57* (2013.01); *G09G 3/3406* (2013.01); *H04N 5/165* (2013.01); *H04N 5/7408* (2013.01);
(Continued)

(58) Field of Classification Search
CPC ................. G09G 3/2003–3/2092; G09G 3/03; G09G 3/3406; G09G 2320/0633; G09G 2330/023; G09G 2320/066; G09G 2340/0442; G09G 2320/0673; H04N 5/57; H04N 5/165; H04N 5/7408

USPC .................... 345/204–215, 690–699, 87–111
See application file for complete search history.

(56) References Cited

U.S. PATENT DOCUMENTS

| | | | |
|---|---|---|---|
| 2001/0036312 A1 | 11/2001 | Shigeta et al. | |
| 2003/0099407 A1* | 5/2003 | Matsushima | ........ H04N 1/4704 382/274 |

(Continued)

FOREIGN PATENT DOCUMENTS

| | | |
|---|---|---|
| JP | 2001-268391 | 9/2001 |
| JP | 2006-145886 | 6/2006 |

(Continued)

OTHER PUBLICATIONS

Extended European Search Report issued Aug. 10, 2014 in corresponding European patent application No. 13 74 3199.

(Continued)

*Primary Examiner* — Jefferey Harold
*Assistant Examiner* — Humam Satti
(74) *Attorney, Agent, or Firm* — Wenderoth, Lind & Ponack, L.L.P.

(57) ABSTRACT

A video display control device includes a video signal processing section that corrects a video signal and outputs a video signal after correction to a display, and a backlight controlling section that controls a light emission amount of a backlight. A control data generating section allocates to a low gradation region of the video signal a high gradation region dynamic range of the video signal in which a video signal corresponding to a black band region is excluded. The backlight controlling section controls a light emission luminance of the backlight so as to cancel out an increase or a decrease in the mean luminance of the video displayed on a screen.

8 Claims, 13 Drawing Sheets

(51) Int. Cl.
*G09G 3/34* (2006.01)
*H04N 5/16* (2006.01)
*H04N 5/74* (2006.01)

(52) U.S. Cl.
CPC .. *G09G 2320/066* (2013.01); *G09G 2320/0633* (2013.01); *G09G 2320/0673* (2013.01); *G09G 2330/023* (2013.01); *G09G 2340/0442* (2013.01)

(56) References Cited

U.S. PATENT DOCUMENTS

| | | | | |
|---|---|---|---|---|
| 2004/0201562 A1* | 10/2004 | Funamoto | G09G 3/3611 | 345/89 |
| 2006/0139270 A1 | 6/2006 | Hong et al. | | |
| 2006/0221260 A1* | 10/2006 | Fujine | G09G 3/3406 | 348/790 |
| 2006/0250385 A1* | 11/2006 | Plut | G09G 5/00 | 345/211 |
| 2009/0052774 A1 | 2/2009 | Yoshii et al. | | |
| 2009/0135208 A1* | 5/2009 | Miura | G03B 21/00 | 345/690 |
| 2009/0167658 A1* | 7/2009 | Yamane | G09G 3/3406 | 345/89 |
| 2009/0262063 A1* | 10/2009 | Fujine | G09G 3/3406 | 345/102 |
| 2009/0304274 A1* | 12/2009 | Yoshii | G06T 5/009 | 382/167 |
| 2010/0053193 A1* | 3/2010 | Nagamatsu | G06T 5/009 | 345/589 |
| 2010/0053195 A1* | 3/2010 | Harada | G06T 5/009 | 345/589 |
| 2010/0225670 A1* | 9/2010 | Groot Hulze | G09G 3/342 | 345/690 |
| 2011/0012824 A1* | 1/2011 | Nonaka | G09G 3/3413 | 345/102 |
| 2013/0120660 A1* | 5/2013 | Akita | G02F 1/13306 | 348/687 |

FOREIGN PATENT DOCUMENTS

| | | |
|---|---|---|
| JP | 2010-45607 | 2/2010 |
| WO | 2006/103835 | 10/2006 |

OTHER PUBLICATIONS

International Search Report issued Apr. 9, 2013 in International Application No. PCT/JP2013/000209.

* cited by examiner

FIG. 9
(a)
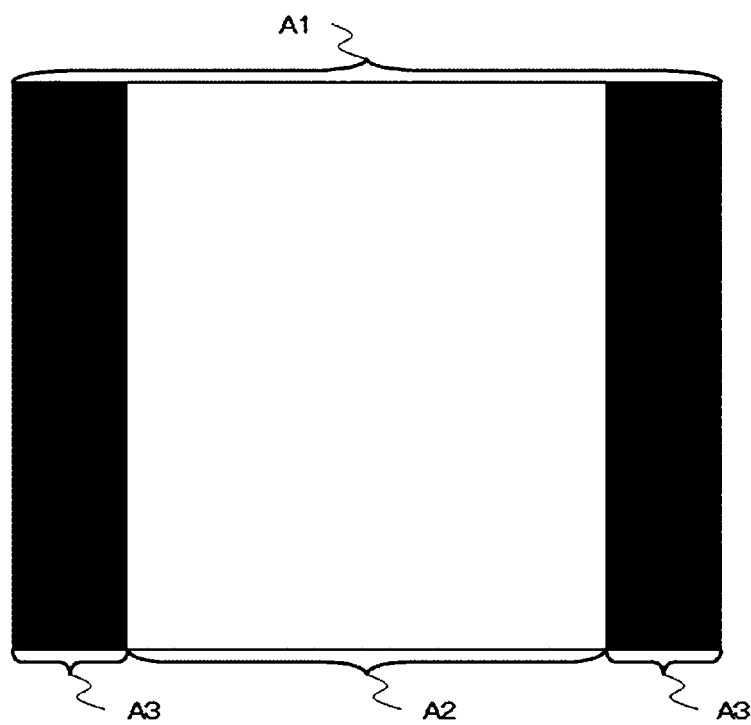
(b)

FIG. 10
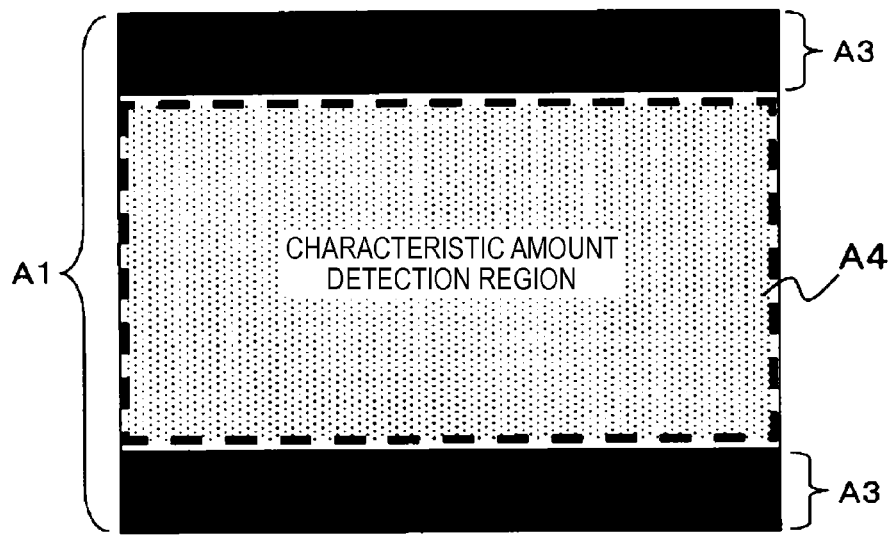
(a)
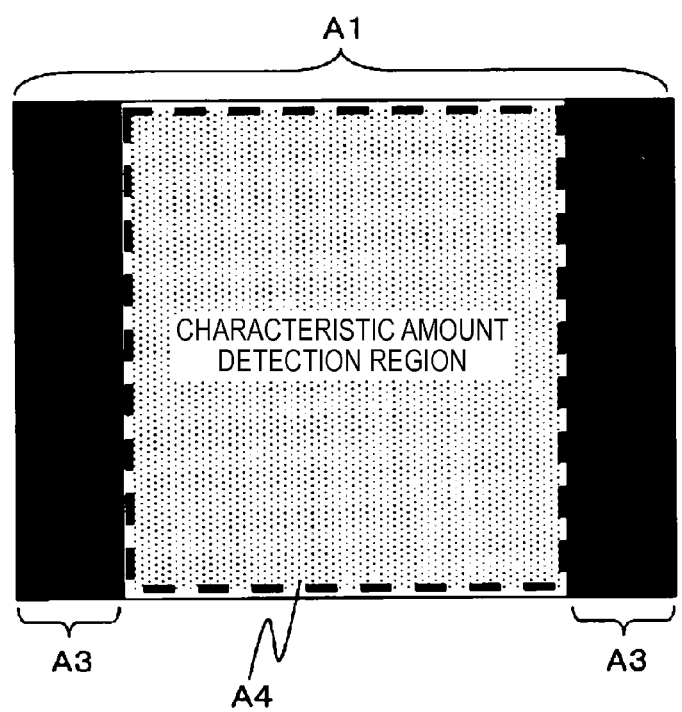
(b)

VIDEO DISPLAY CONTROL DEVICE

TECHNICAL FIELD

The present invention relates to a video display control device that controls a contrast of a video displayed on a display and a light emission luminance of a backlight.

BACKGROUND ART

In a conventional display, it is common that a contrast of a displayed video or a light emission luminance of a backlight is adjusted by a manual operation of an user. In recent years, a method of dynamically controlling a contrast of a displayed video and a light emission luminance of a backlight in accordance with an input video signal varying with the lapse of time has been proposed in order to improve image quality or reduce consumption power (see, for example, Patent Document 1). In accordance with the above method, reduction of consumption power can be achieved while raising a contrast of a displayed video.

PRIOR ART DOCUMENTS

Patent Documents

Patent Document 1: JP-A-2006-145886

SUMMARY OF INVENTION

Problems that the Invention is to Solve

However, since controlling of a contrast of a displayed video and a light emission luminance of a backlight is performed on the basis of a maximum luminance of a display in the above method, the effectiveness is sometimes lowered in an actual video in which white characters such as captions, tickers or the like are partially superimposed.

The purpose of the invention is to provide a video display control device that can achieve improvement of a contrast and reduction of consumption power even when am amplitude of a video signal is equal to a width of a dynamic range.

Means for Solving the Problem

To attain the above-mentioned object, a video display control device of the present invention is a video display control device that controls displaying of a video on a display having a screen and a backlight for emitting light toward the screen, the video display control device includes: a black band detecting section that detects a black band region of a video signal input to the video display control device; a characteristic detecting section that detects a mean luminance and a value of histogram related to a luminance of a video signal, corresponding to a characteristic amount detection region which is a predetermined region of the video signal input to the video display control device; a control data generating section that generates control data for correcting the video signal based on values detected by the characteristic detecting section; a video signal processing section that corrects the video signal based on the control data generated by the control data generating section and outputs a video signal after correction to the display; and a backlight controlling section that controls a light emission amount of the backlight based on a difference between the mean luminance of the video signal and a mean luminance of the video signal after the correction, wherein the characteristic detecting section sets a video signal of a region excepting the black band region detected by the black band detecting section, as the video signal of the characteristic amount detection region; wherein the control data generating section generates control data for the video signal processing section to perform correction of allocating a dynamic range of a high gradation region of the video signal of the region that is set as the characteristic amount detection region, to a low gradation region of the video signal; the video signal processing section corrects the video signal of the region excepting the black band region detected by the black band detecting section of the video signal inputted to the video display control device, and wherein the backlight controlling section controls a light emission luminance of the backlight so as to cancel an increase or decrease of the mean luminance of video displayed on the screen in accordance with an increase or decrease of the mean luminance of the video signal after the correction with respect to the mean luminance of the video signal.

Advantage of the Invention

In accordance with the video display control device of the invention, a dynamic range of a high gradation region is allocated to a low gradation region and a light emission luminance of the backlight is controlled so as to cancel an increase or decrease of a mean luminance of a video to be displayed on a screen in accordance with an increase or decrease of a mean luminance of a video signal caused by the allocating. Therefore, it is possible to achieve improvement of a contrast and further reduction of consumption power while maintaining a visual brightness of a video at a roughly constant level even when an amplitude of a video signal is equal to a width of a dynamic range.

BRIEF DESCRIPTION OF THE DRAWINGS

FIG. 9(a) and FIG. 9 (b) are structural views of input video V, FIG. 9 (a) is a view showing an example in which black band regions are disposed above and below, and FIG. 9 (b) is a view showing an example in which black band regions are disposed on the right and left.

FIG. 10 (a) and FIG. 10 (b) are views showing a relationship between the input video V and a characteristic amount detection region, FIG. 10 (a) is a view showing an example of the characteristic amount detection region when the black band regions are disposed above and below, and FIG. 10 (b) is a view showing an example of the characteristic amount detection region when the black band regions are disposed on the right and left.

FIG. 11(a) is a view showing an example of the characteristic amount detection region in the first embodiment, FIG. 11(b) is a view showing an example of a post-correction gamma characteristic based on the value of histogram obtained by the first embodiment and an example of a post-correction gamma characteristic based on the value of histogram after the processing of step S30 is performed, FIG. 11(c) is a view showing an example of the characteristic amount detection region in the second embodiment, and FIG. 11(d) is a view showing an example of a post-correction gamma characteristic based on the value of histogram obtained by the second embodiment and an example of a post-correction gamma characteristic based on the value of histogram after the processing of S30 is performed.

MODE FOR CARRYING OUT THE INVENTION

Figure 1:
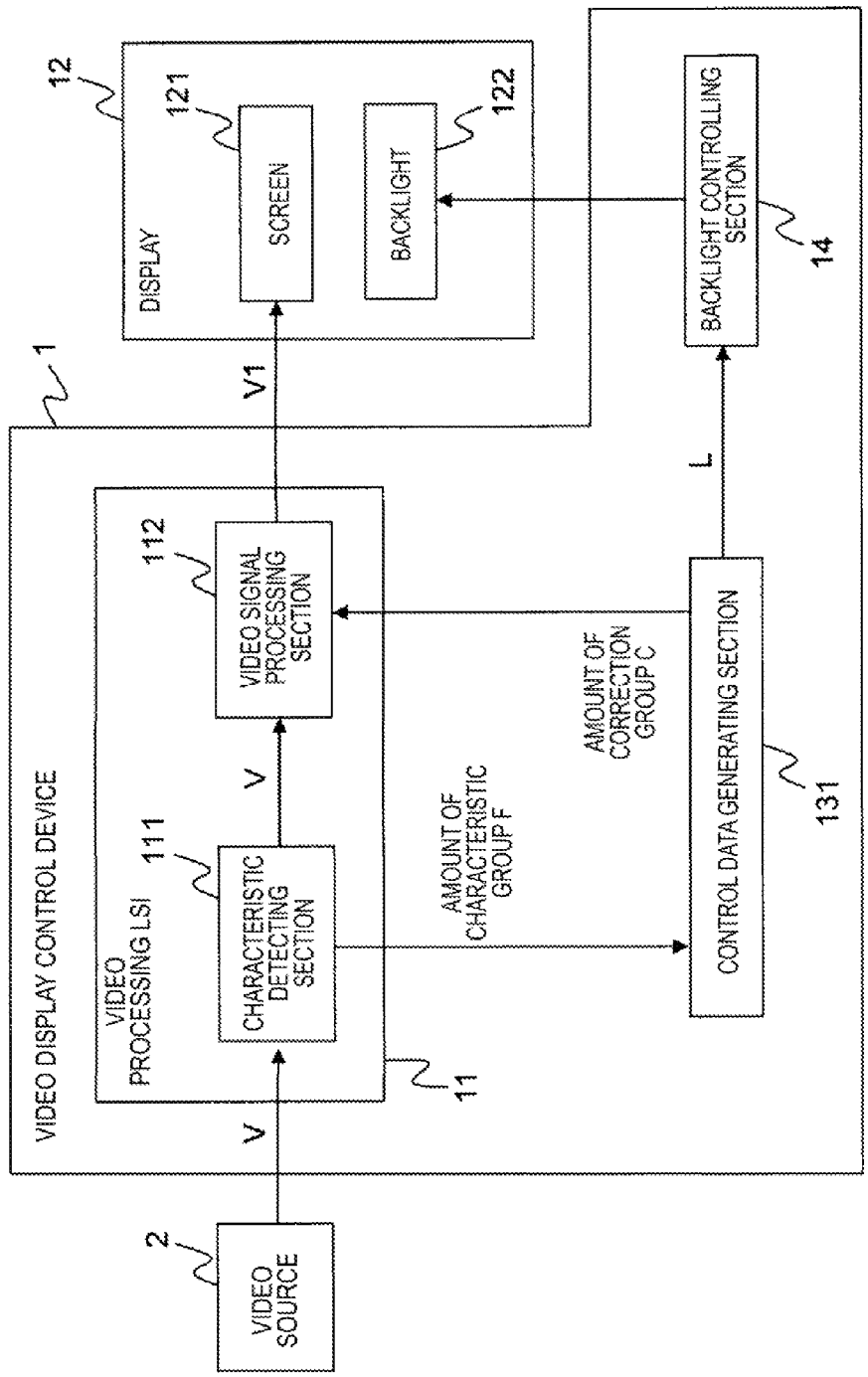
FIG. 1 is a block diagram showing structures of a video display control device and its peripherals according to an embodiment of the invention.

FIG. 1 is a block diagram showing structures of a video display control device and its peripherals according to a first embodiment of the invention. As shown in FIG. 1, a video source 2 such as a DVD player or the like is connected to an input side of the video display control device 1 and a display 12 is connected to an output side thereof.

The display 12 is, for example, a liquid crystal display and is provided with at least a screen 121 and a backlight 122. A video according to a video signal V1 transmitted from the video display control device 1 is displayed on the screen 121. The backlight 122 is disposed at a back side of the screen 121, and applies light toward the screen 121 in order to display a video. Incidentally, a light emission luminance of the backlight 122 is controlled by the video display control device 1.

The video display control device 1 is provided with a video processing LSI 11, a control data generating section 131 and a backlight controlling section 14. The video processing LSI 11 applies a predetermined processing to a video signal V received from the video source 2, and outputs a video signal V1 after processing to the display 12. The video processing LSI 11 has a characteristic detecting section 111 and a video signal processing section 112.

The characteristic detecting section 111 calculates an amount of characteristic group F of a video represented by the video signal V. The characteristic detecting section 111 outputs the calculated the amount of characteristic group F to the control data generating section 131. The amount of characteristic group F is information including a mean luminance APL of the video signal V and a value of a histogram. In addition, the characteristic detecting section 111 outputs the video signal V to the video signal processing section 112 at its post-stage.

The mean luminance APL is a value obtained by dividing a total sum of luminance values of pixels in one frame indicated by the video signal V by a total number of pixels in the frame. The value of the histogram is a parameter indicating a gradient distribution of luminance in one frame of the video indicated by the video signal V.

Figure 2:
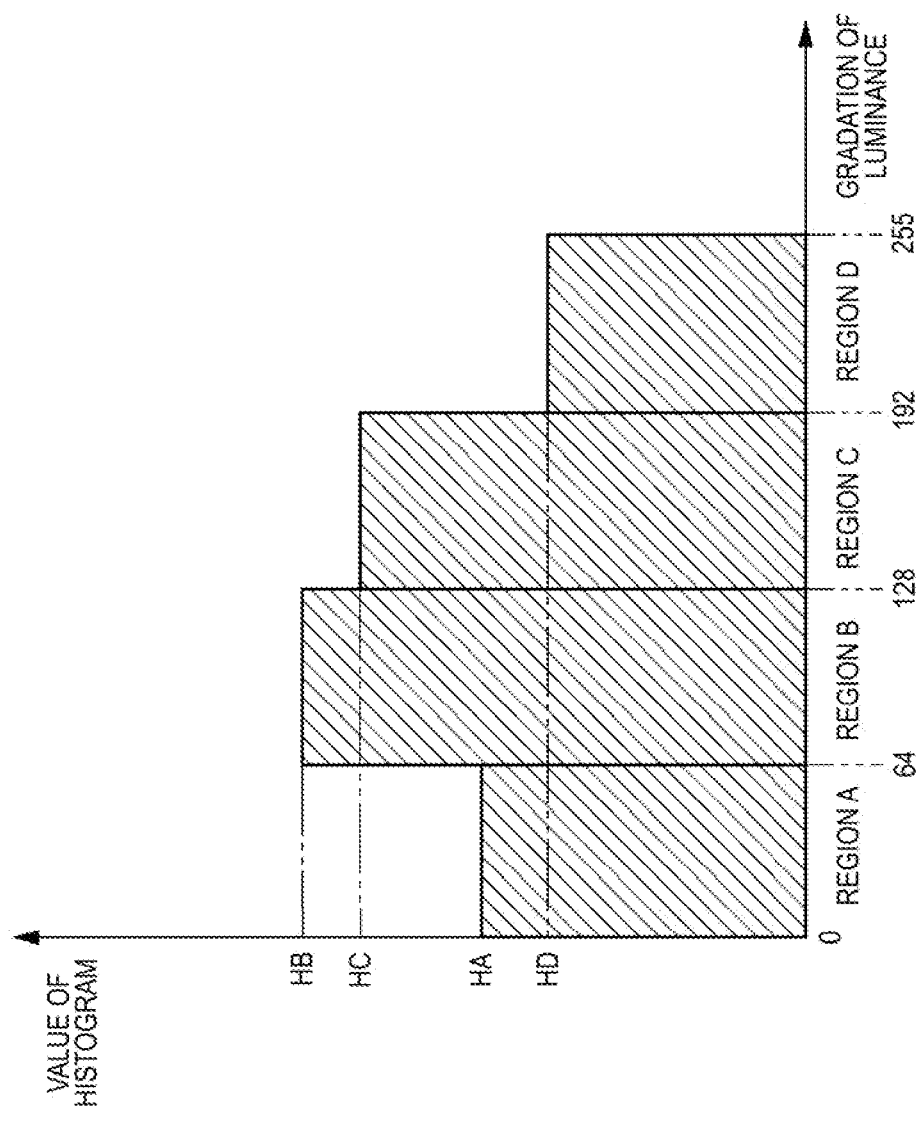
FIG. 2 is a schematic view showing an example of a histogram.

FIG. 2 is a schematic view showing an example of a histogram. In the embodiment, as shown in FIG. 2, a luminance level is represented by 256 gradations (8 bits) from 0 to 255. The characteristic detecting section 111 divides 256 gradations indicating a luminance level of each of pixels forming one frame into four regions A to D and detects a value of a histogram of each of the regions.

In the descriptions below, a value of a histogram of the region A (gradations 0 to 63) is represented by HA, a value of a histogram of the region B (gradations 64 to 127) is represented by HB, a value of a histogram of the region C (gradations 128 to 191) is represented by HC, and a value of a histogram of the region D (gradations 192 to 255) is represented by HD.

The video signal processing section 112 corrects the video signal V on the basis of the amount of correction group C received from the control data generating section 131. The video signal processing section 112 outputs the corrected video signal V1 to the display 12. An amount of correction group C is a parameter for correcting a gamma characteristic, and the detail thereof will be described later.

The backlight controlling section 14 controls a light emission luminance of the backlight 122 providing the display 12 on the basis of a luminance control signal L received from the control data generating section 131.

Figure 3:
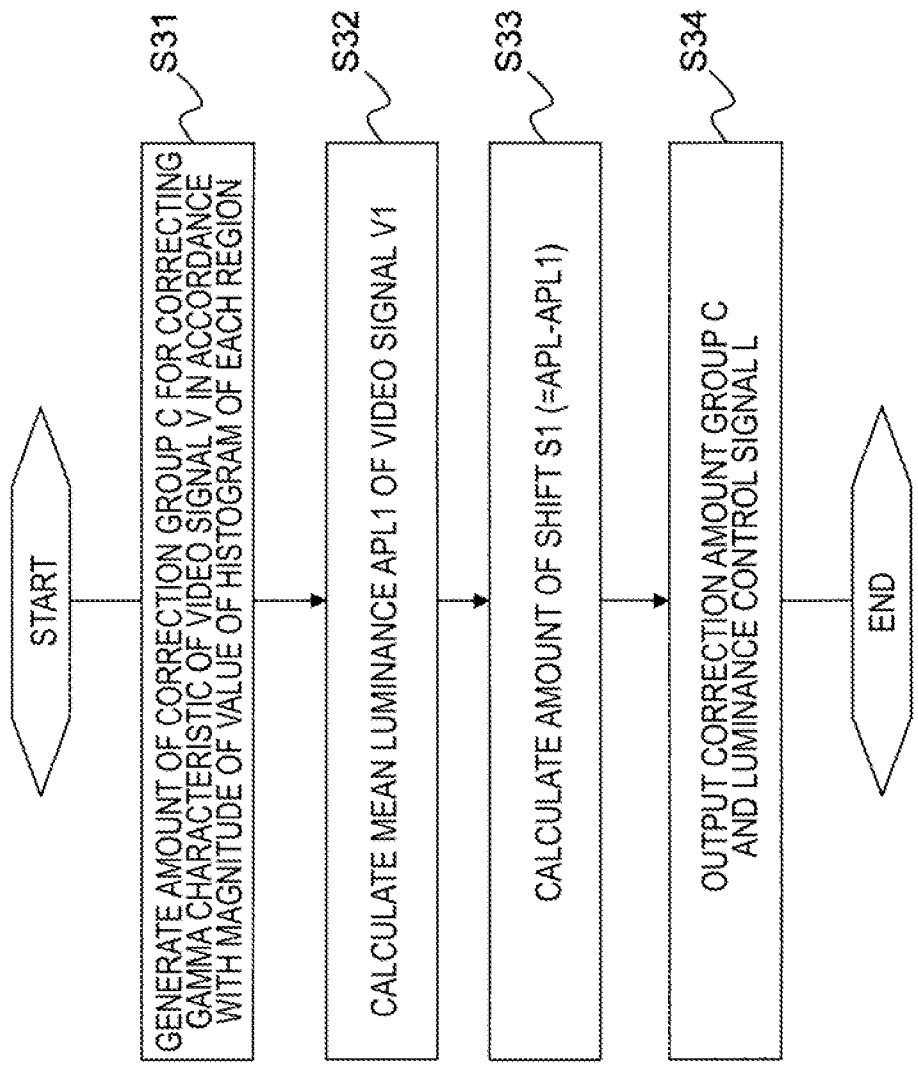
FIG. 3 is a flowchart showing an operation of a control data generating section 131.

The control data generating section 131 executes a program stored in a memory (not shown) so as to generate the amount of correction group C to be transmitted to the video signal processing section 112 and the luminance control signal L to be transmitted to the backlight controlling section 14. FIG. 3 is a flowchart showing an operation of the control data generating section 131. Hereinafter, a contrast improving process as a basic operation of the control data generating section 131 is described with reference to FIG. 3.

As shown in FIG. 3, the control data generating section 131 generates the amount of correction group C for correcting the gamma characteristic of the video signal V in accordance with magnitudes of the values HA to HD of the histograms of the video signal V included in the amount of characteristic group F obtained from the characteristic detecting section 111 (step S31). The amount of correction group C includes information indicative of slopes and intercepts of straight lines of the respective regions A to D indicating the gamma characteristic after the correction. Meanwhile, the four straight lines indicating the corrected gamma characteristic is referred to as "a line graph of gamma" in the descriptions below.

Figure 4:
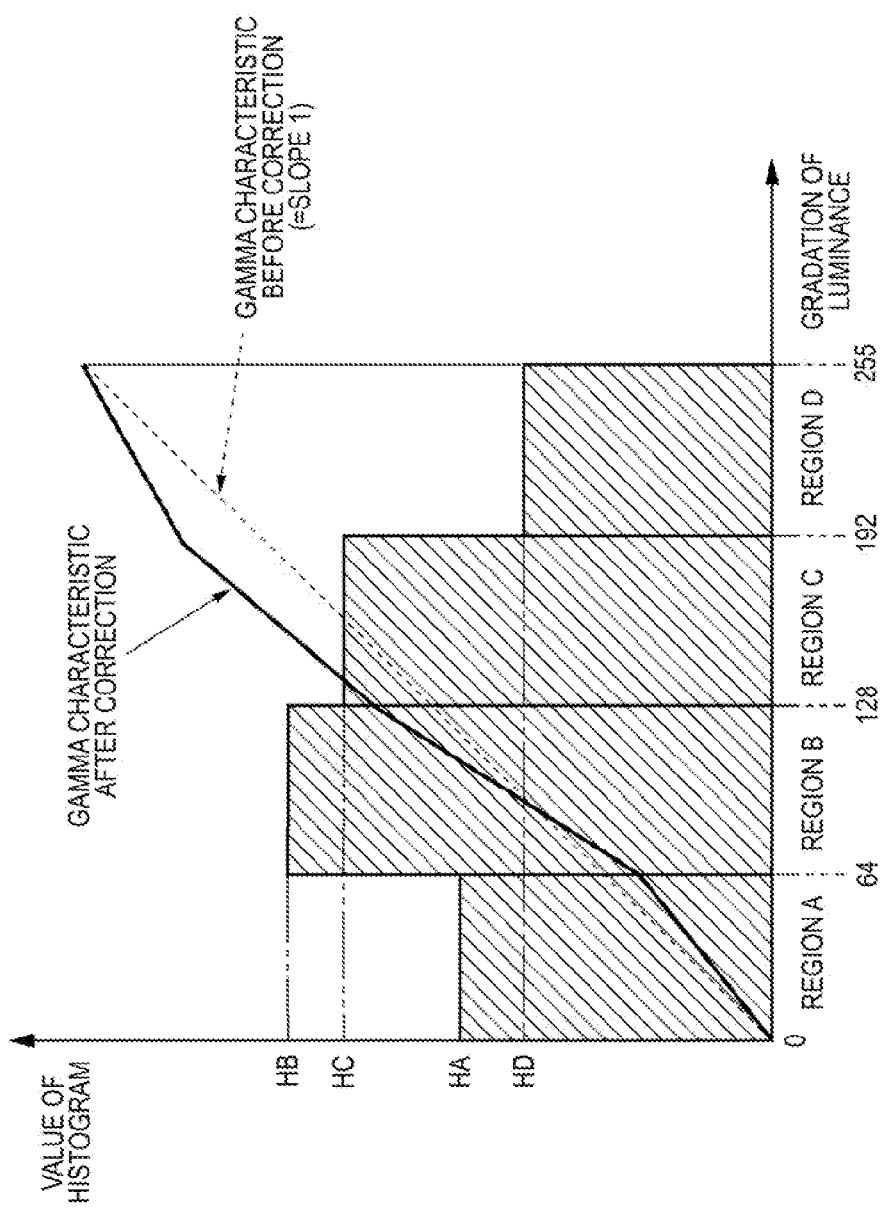
FIG. 4 is a graph showing examples of gamma characteristics pre and post correction of a video signal based on a value of the histogram shown in FIG. 2.

FIG. 4 is a graph showing gamma characteristics pre and post correction of the video signal based on a value of the histogram shown in FIG. 2. Controlling is performed such that the gamma characteristic before processing represented by one straight line indicated by a dotted line in FIG. 4 is made to be the gamma characteristic (the gamma characteristic after processing) formed of four straight lines in which the slope of the region having the large value of the histogram is made to be large and the slope of the region having the small value of the histogram is made to be small in accordance with the values of the histograms of the respective regions A to D.

When the gamma characteristic of the video signal V based on the amount of correction group C is corrected, a dynamic range of the region of which the value of the histogram is relatively large, is enlarged, but a dynamic range of the region of which the value of the histogram is relatively small, is reduced. Therefore, the further the slope after the correction is larger than the slope before the correction, the more the dynamic range is enlarged, but the further the slope after the correction is smaller than the slope before the correction, the more the dynamic range is reduced.

Incidentally, as shown in FIGS. 2 and 4, in a case that gradations 0 to 256 are divided into four regions A to D, the slopes of the straight lines indicating the gamma characteristics after the correction in the respective regions are calculated by using the following formulas. The characteristic detecting section 111 calculates the slopes of the straight lines of the respective regions on the basis of the values HA to HD of the histograms of the video signal V included in the amount of characteristic group F.

Slope of region $A=HA/\{(HA+HB+HC+HD)\times 64\}$

Slope of region $B=HB/\{(HA+HB+HC+HD)\times 64\}$

Slope of region $C=HC/\{(HA+HB+HC+HD)\times 64\}$

Slope of region $D=HD/\{(HA+HB+HC+HD)\times 64\}$

Next, the control data generating section 131 calculates a mean luminance APL1 of the video signal V1 of which the gamma characteristic is corrected, on the basis of the value of the histogram included in the amount of characteristic group F and the gamma characteristic after the correction (step S32). Next, the control data generating section 131 calculates a difference (an amount of shift S1) between the mean luminance APL1 of the video signal V1 and the mean luminance APL of the video signal V on the basis of formula (1) described below (step S33).

Amount of shift $S1=APL-APL1$ (1)

Next, the control data generating section 131 outputs the amount of correction group C including the slopes and the intercepts of the line graph of gamma calculated in step S31 to the video signal processing section 112 (step S34). The amount of correction group C functions as a gamma correction parameter for the video signal processing section 112. In addition, the control data generating section 131 outputs the luminance control signal L indicative of the amount of shift S1 calculated in step S33 to the backlight controlling section 14 (step S34).

The video signal processing section 112 corrects the video signal V on the basis of the amount of correction group C obtained from the control data generating section 131, and outputs the video signal V1 after the correction to the display 12. In addition, the backlight controlling section 14 increases or decreases the light emission luminance of the backlight 122 by the amount of shift S1 represented by the luminance control signal L from its reference luminance value on the basis of the luminance control signal L obtained from the control data generating section 131.

In the embodiment, since the mean luminance is lowered due to the correction of the video signal V in a case that the amount of shift S1 is a positive value, the backlight controlling section 14 controls the backlight 122 so as to cause the light emission luminance to be higher than the reference luminance value by the amount of shift S1. On the other hand, in a case that the mean luminance is increased due to the correction by the video signal processing section 112, since the amount of shift S1 becomes a negative value based on the above formula (1), the backlight controlling section 14 controls the backlight 122 so as to cause the light emission luminance to be lower than the reference luminance value by the amount of shift S1.

In accordance with the embodiment described above, the 256 gradations indicative of the luminance levels of the respective pixels in the frame indicated by the video signal are divided into the plurality of regions, and the gamma characteristics of the video signal are corrected in such a manner that the slope of the region of which the value of the histogram is relatively large is made to be increased and the slope of the region of which the value of the histogram is relatively small is made to be decreased. Therefore, a wide dynamic range is allocated to a portion of the luminance level occupying a large area with respect to the screen. Therefore, even in a case that an amplitude of the video signal is similar to a width of the dynamic range because the video partially has white characters such as closed captions, tickers or the like superimposed therein, the contrast of the video can be improved without causing harmful effect such as whiteout or the like.

In addition, the light emission luminance of the backlight 122 of the display 12 is increased or decreased on the basis of the difference between the mean luminance APL of the video signal V and the mean luminance APL1 of the video signal V1 of which the gamma characteristic is corrected. Therefore, since the light emission luminance of the backlight 122 is controlled in accordance with the mean luminance, it is possible to maintain a visual brightness of the video on the screen 121 at a roughly constant level even when the mean luminance is changed due to the correction of the gamma characteristic.

Figure 5:
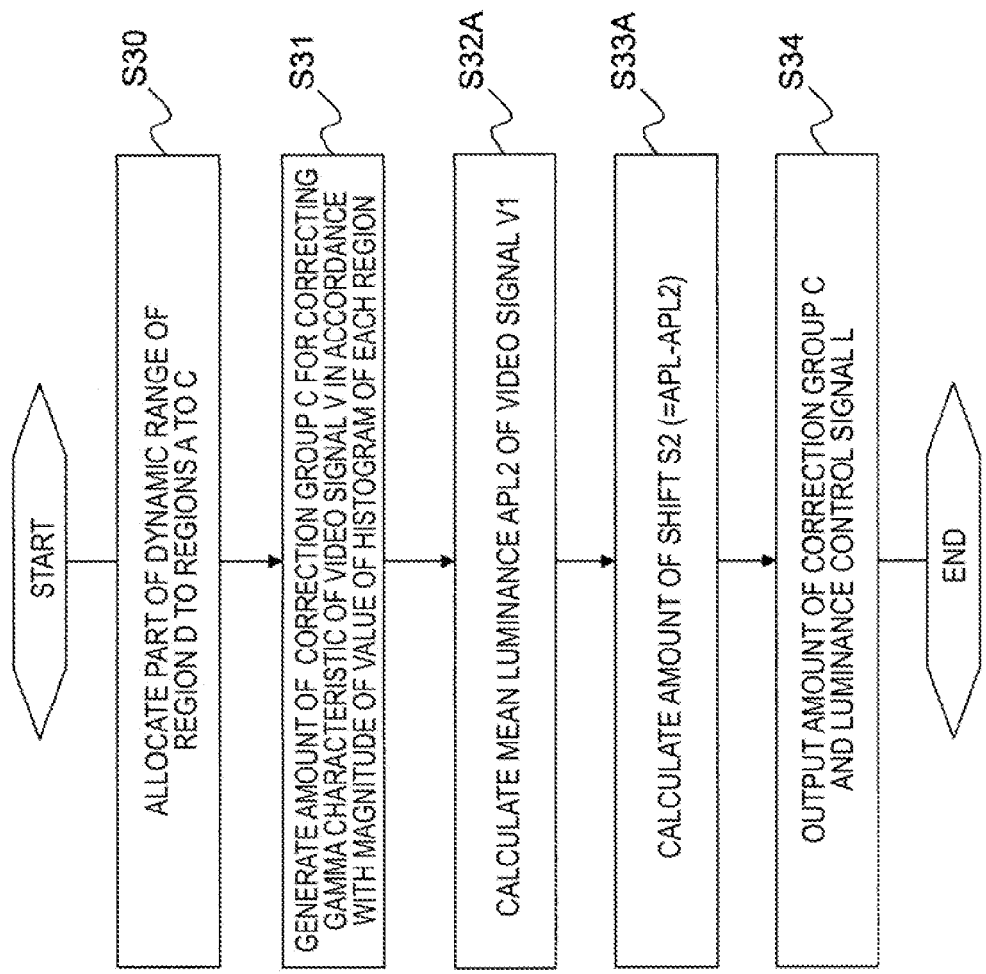
FIG. 5 is a flowchart showing an operation of the control data generating section 131, which is developed from the example shown in FIG. 3.

FIG. 5 is a flowchart showing an operation of the control data generating section 131 which is developed from the example shown in FIG. 3. Hereinafter, a process of improving a contrast and a process of reducing consumption power by the control data generating section 131 are described with reference to FIG. 5. The control data generating section 131 performs a process of allocating a part of a dynamic range allocated to a region having the highest gradation to the other ranges (step S30). In the example shown in FIG. 2, the control data generating section 131 performs a process of allocating a part of the dynamic range (the slope of the line graph of the region D) to the regions A to C.

Meanwhile, an amount of the dynamic range to be allocated from the region (the region D) having the highest gradation to the other regions (the regions A to C) can be a predetermined one, or one corresponding to a predetermined rate of the dynamic range of the region D. In addition, a distribution of the dynamic range to be allocated to each of the other regions (the regions A to C) can be equalized or weighted in a predetermined level.

Figure 6:
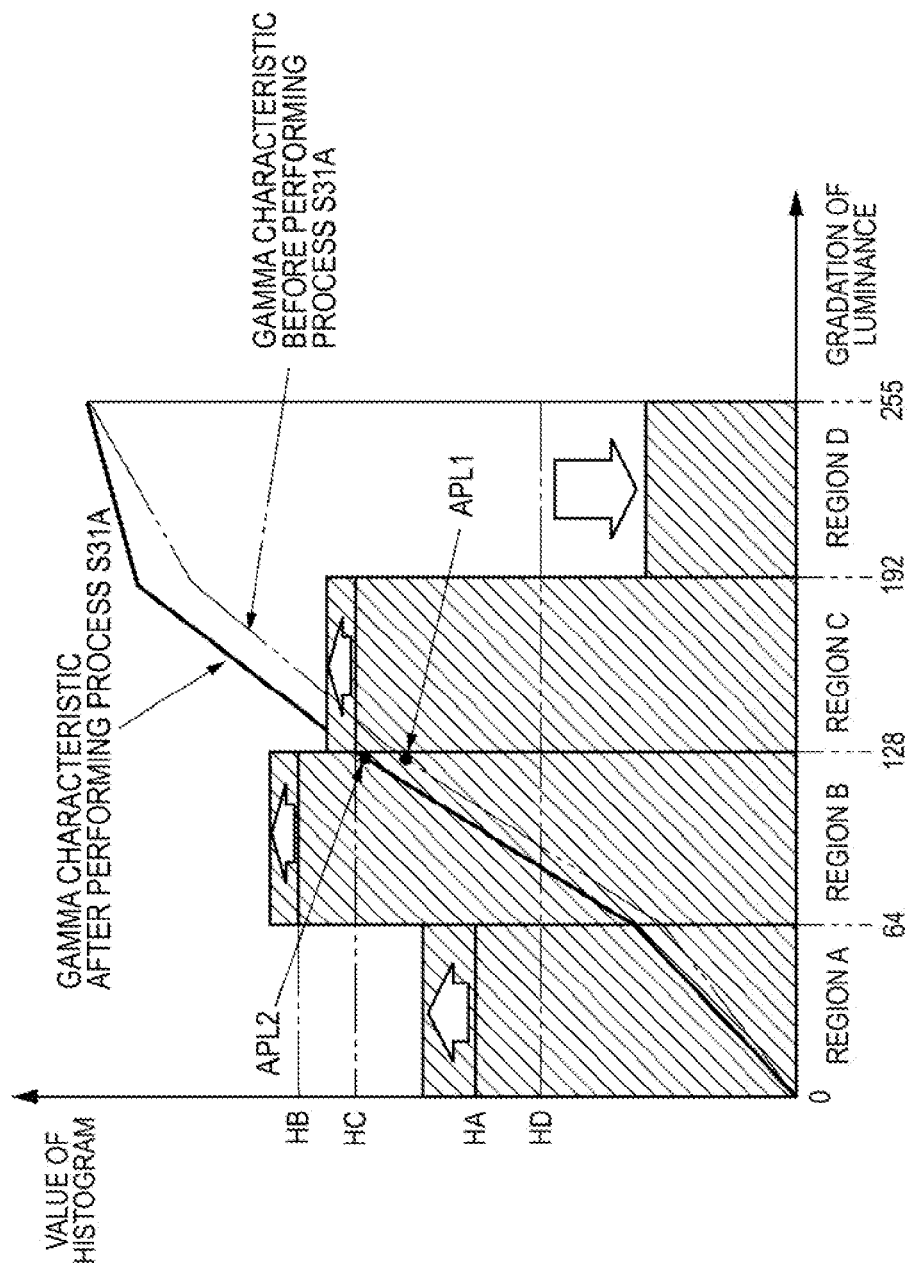
FIG. 6 is a graph showing an example of a gamma characteristic after correction based on the value of the histogram shown in FIG. 4 and an example of a gamma characteristic after correction based on a value of a histogram obtained after performing a process of step S30.

FIG. 6 is a graph showing a gamma characteristic after correction based on the value of the histogram shown in FIG. 4 and a gamma characteristic after correction based on the value of the histogram obtained after performing the process of step S30. In the example shown in FIG. 6, 40% of the dynamic range of the region D is distributed to the other regions (the regions A to C). The dynamic range distributed from the region D is distributed to the region A, the region B and the region C by respective rates of 50%, 25% and 25%.

As shown in FIG. 6, by allocating the part of the dynamic range of the region D to the regions A to C, the dynamic ranges of the regions A to C are respectively increased. Therefore, the value of the histogram of the region D is decreased and the values of the histograms of the regions A to C are increased.

In this condition, the control data generating section 131 performs the process of step 31 described with reference to FIG. 3. As a result, a mean luminance APL2 of the video signal V1 corrected based on the amount of correction group C generated in step S31, becomes higher than the mean luminance APL of the video signal V.

In other words, when the dynamic ranges of the regions A to C are enlarged by allocating the part of the dynamic range of the region D to the regions A to C, the luminance of the pixels belonging to the regions A to C are bit increased as a whole so that the mean luminance of the corrected video signal V1 is increased.

Next, the control data generating section 131 calculates the mean luminance APL2 of the video signal V1 of which the gamma characteristic is corrected on the basis of the value of the histogram changed in step S30 and the gamma characteristic after the correction (step S32A). Next, the control data generating section 131 calculates a difference (an amount of shift S2) between the mean luminance APL2 of the video signal V1 and the mean luminance APL of the video signal V in accordance with formula (2) described below (step S33A).

$$\text{Amount of shift } S2 = APL - APL2 \quad (2)$$

Next, the control data generating section 131 outputs the amount of correction group C including the slopes and the intercepts of the line graph of gamma calculated in step S31 to the video signal processing section 112 (step S34). The amount of correction group C functions as a gamma correction parameter for the video signal processing section 112. In addition, the control data generating section 131 outputs the luminance control signal L indicative of the amount of shift S2 calculated in step S33A to the backlight controlling section 14 (step S34).

As shown in FIG. 6, the mean luminance APL2 of the video signal V1 to which the distribution of the dynamic range (the process of step S30) is applied, is higher than the mean luminance APL1 of the video signal V1 to which the above process is not applied. Therefore, the amount of shift S2 becomes a value which is increased in a negative direction as compared to the above described amount of shift S1. The backlight controlling section 14 controls the backlight 122 so as to decrease the light emission luminance to be smaller than the reference luminance value by the amount of shift S2. Consequently, the light emission luminance of the backlight 122 is decreased by the difference between the mean luminance APL2 and APL1 as compared to a case where the process of step S30 is not performed.

In the above description, in accordance with the examples shown in FIGS. 5 and 6, the dynamic range of the high gradation region (the region D in the example shown in FIG. 2) is allocated to the low gradation regions (the regions A to C in the example shown in FIG. 2), and the light emission luminance of the backlight 122 is decreased so as to cancel the increased amount of the mean luminance of the video signal generated in the above process. As a result, consumption power of the backlight 122 can be reduced with maintaining the visual brightness of the video on the screen 121 at a roughly constant level.

In addition, in contrast to a case where a linear gain is merely applied to a video signal, since a gain having a nonlinear characteristic due to a line graph of gamma is applied to the video signal, it is possible to achieve reduction of consumption power with suppressing harmful effect in image quality such as whiteout or the like.

Therefore, since both of the process of improving a contrast and the process of reducing consumption power are performed, it is possible to achieve the reduction of the consumption power and the improvement of the contrast with maintaining the brightness of the whole screen at a constant level.

Meanwhile, in order to prevent flickering caused by varying of the parameter for gamma correction or the amount of shift of the amount of correction group C by each frame of the video, the video signal processing section 112 or the backlight controlling section 14 can perform a process or a control in response to the parameter for gamma correction or the amount of shift via a low-pass filter.

In the above description, since the gradations are divided into four regions, the line graph of gamma has four straight lines. However, the number of regions is not limited to four but can be a plurality (two or more). Therefore, the line graph of gamma is formed of straight lines of which the number is the same as that of the regions.

In addition, the control data generating section 131 can change an amount of a dynamic range to be allocated to other regions from a high gradation region in accordance with a value of a histogram of the high gradation region. When controlling of decreasing the light emission luminance of the backlight 122 is performed by allocating a part of the dynamic range of the high gradation region to the other regions, a visual brightness of a low gradation region is roughly maintained at a constant level, but a peak luminance in the vicinity of a portion of white 100% is lowered.

Therefore, a visual brightness in a scene including many bright pixels may be possibly lowered. However, by reducing an amount (a rate) of a dynamic range to be allocated to other regions from a high gradation region in a scene having many bright pixels, the visual brightness can be maintained at a constant level even in the scene having many bright pixels.

In step S30, the control data generating section 131 decreases the amount (the rate) of the dynamic range to be allocated to the other regions from the region D in a case that the value HD of the histogram of the region D is large, but increases the amount (the rate) of the dynamic range to be allocated to the other regions from the region D in a case that the value HD of the histogram of the region D is small.

Figure 7:
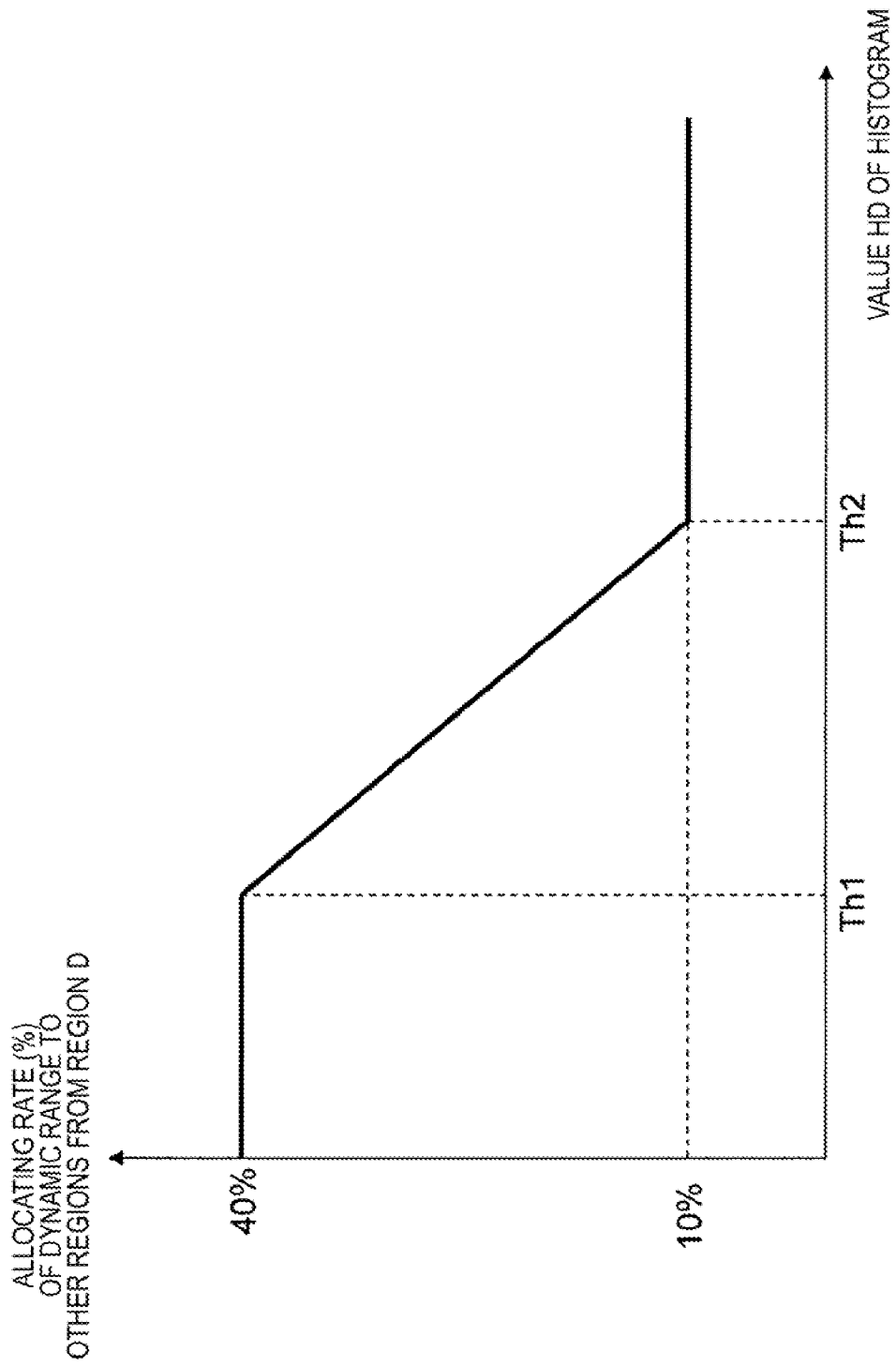
FIG. 7 is a view showing an example of an induction reference of an amount (a rate) of a dynamic range to be allocated to other regions from a region D.

FIG. 7 is a graph showing an example of an induction reference of the amount (the rate) of the dynamic range to be allocated to the other regions from the region D. As shown in FIG. 7, the control data generating section 131 allocates 10% of the dynamic range of the region D to the other regions in a case that the value HD of the histogram is larger than a second threshold value Th2, but allocates 40% of the dynamic range of the region D to the other regions in a case that the value HD of the histogram is smaller than a first threshold value Th1.

In addition, in a case that the value HD of the histogram is larger than the first threshold value Th1 and smaller than the second threshold value Th2, the control data generating section 131 allocates 10 to 40% of dynamic range of the region D to the other regions, the higher the value HD of the histogram is, the smaller the rate is.

However, in a case that the value HD of the histogram is larger than the first threshold value Th1 and smaller than the second threshold value Th2, the control data generating section 131 can allocate a fixed rate of the dynamic range of the region D to the other regions, the fixed rate being between 10% to 40%.

Second Embodiment

Figure 8:
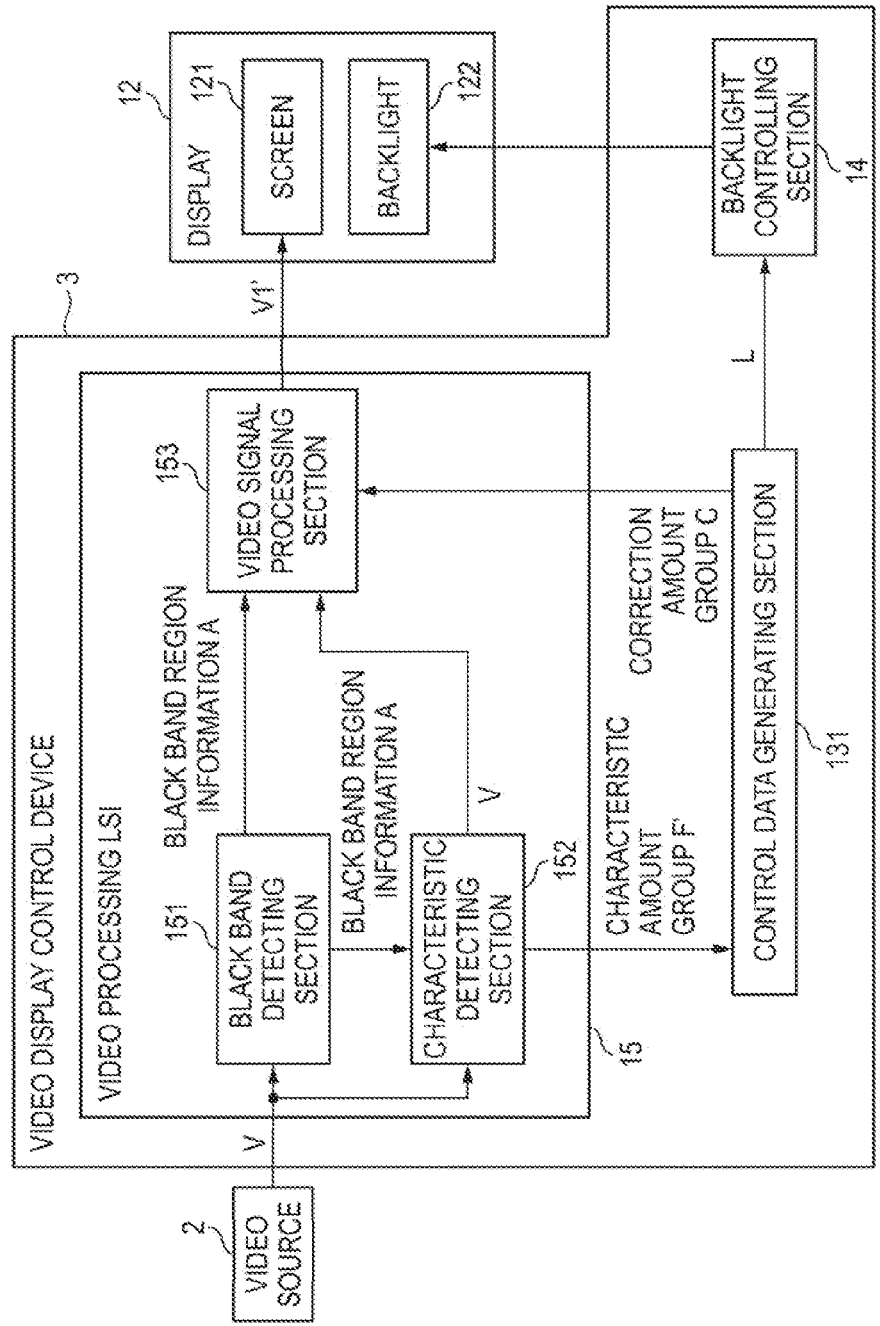
FIG. 8 is a block diagram showing a video display control device and its peripheral structure in a second embodiment of the present invention.

Hereinafter, a video display control device of a second embodiment of the present invention will be described by using the drawings. FIG. 8 is a block diagram showing a video display control device 3 and its peripheral structure in the second embodiment of the present invention.

Here, in the present embodiment, structures similar to those of the first embodiment are denoted by the same reference numerals and signs, and detailed descriptions thereof are omitted.

As shown in FIG. 8, the video display control device 3 is provided with a video processing LSI 15, the control data generating section 131 and the backlight controlling section 14. The video processing LSI 15 has a black band detecting section 151, a characteristic detecting section 152 and a video signal processing section 153.

The video signal V output from the video source 2 is constructed so that an entire video region A1, an actual video region A2 and black band regions A3 are formed as shown in FIG. 9(*a*) and FIG. 9(*b*) when the video signal V is displayed on the display 12.

The entire video region A1 is a region displayed on the display 12. The actual video region A2 is, of the entire video region displayed on the display, a region where a video such as a still image or a moving image to be viewed by the user are displayed.

The black band regions A3 are regions disposed above and below the actual video region A2 in order to display a video source with an aspect ratio of 16:9 on a display with an aspect ratio of 4:3 at the aspect ratio of the original video as shown in FIG. 9(*a*).

Alternatively, the black band regions A3 may be regions disposed on the right and left of the actual video region A2 in order to display a video source with an aspect ratio of 4:3 on a display with an aspect ratio of 16:9 at the aspect ratio of the original video as shown in FIG. 9(*b*).

The black band detecting section 151 detects the black band regions A3 of the video representative of the video signal V, and outputs black band region information A (for example, coordinate information) based on the black band regions to the characteristic detecting section 152 and the video signal processing section 153.

Here, regarding the detection function of the black band detecting section 151 to detect the black band regions A3 included in the video signal V, since it is realized by using a known technology using the luminance information, chromaticity information, coordinate information and the like of the video signal, a detailed description thereof is omitted.

The characteristic detecting section 152 changes (sets) the region of the entire video region A1 including no black band region A3, as a characteristic amount detection region A4 as shown in FIG. 10(*a*) and FIG. 10(*b*) based on the black band region information A output from the black band detecting section 151, and calculates a characteristic amount group F' of the video represented by the video signal V.

Here, FIG. 10(*a*) shows a display condition where the black band regions A3 are disposed above and below the actual video region A2 in order to display a video source with an aspect ratio of 16:9 on a display with an aspect ratio of 4:3 at the aspect ratio of the original video, and FIG. 10(*b*) shows a display condition where the black band regions are disposed on the right and left of the actual video region A2 in order to display a video source with an aspect ratio of 4:3 on a display with an aspect ratio of 16:9 at the aspect ratio of the original video.

The characteristic detecting section 152 outputs the calculated characteristic amount group F' to the control data generating section 131. The characteristic amount group F' is information including the mean luminance APL and the value of histogram of the video signal V. Moreover, the characteristic detecting section 152 outputs the video signal V to the succeeding video signal processing section 112.

The video signal processing section 153 determines whether to perform the correction of the video signal V based on the correction amount group C transmitted from the control data generating section 131 or not, based on the black band region information A output from the black band detecting section 151.

For the actual video region A2, the video signal processing section 153 performs the correction of the video signal V based on the correction amount group C transmitted from the control data generating section 131. And for the black band regions A3, the video signal processing section 153 does not perform the correction of the video signal V based on the correction amount group C transmitted from the control data generating section 131.

The video signal processing section 153 outputs a video signal after correction V1' to the display 12. The correction amount group C is a parameter to correct the gamma characteristic.

The difference between the first embodiment and the second embodiment is that the black band detecting section 151 is provided that has the function of detecting the black band regions A3 of the video signal V and outputting the black band region information A based thereon, that the characteristic detecting section 152 is provided that has the function of changing the characteristic amount detection region A4 based on the black band region information A output by the black band detecting section 151 and calculating and outputting the characteristic amount group F' of the video represented by the video signal V and that the video signal processing section 153 is provided that has the function of determining the presence or absence of performance of the correction of the video signal V based on the black band region information A output by the black band detecting section 151 and outputting the video signal after correction V1'. Here, the correction processing performed by the video signal processing section 153 is similar to the contents described in detail in the first embodiment.

(Modification)

While in the description given above, the black band detecting section 151 detects the black band regions A3 included in the video signal V by using the luminance information, chromaticity information, coordinate information and the like of the video signal V, an example in which the black band region information A is used by using a different structure will be described below.

Figure 12:
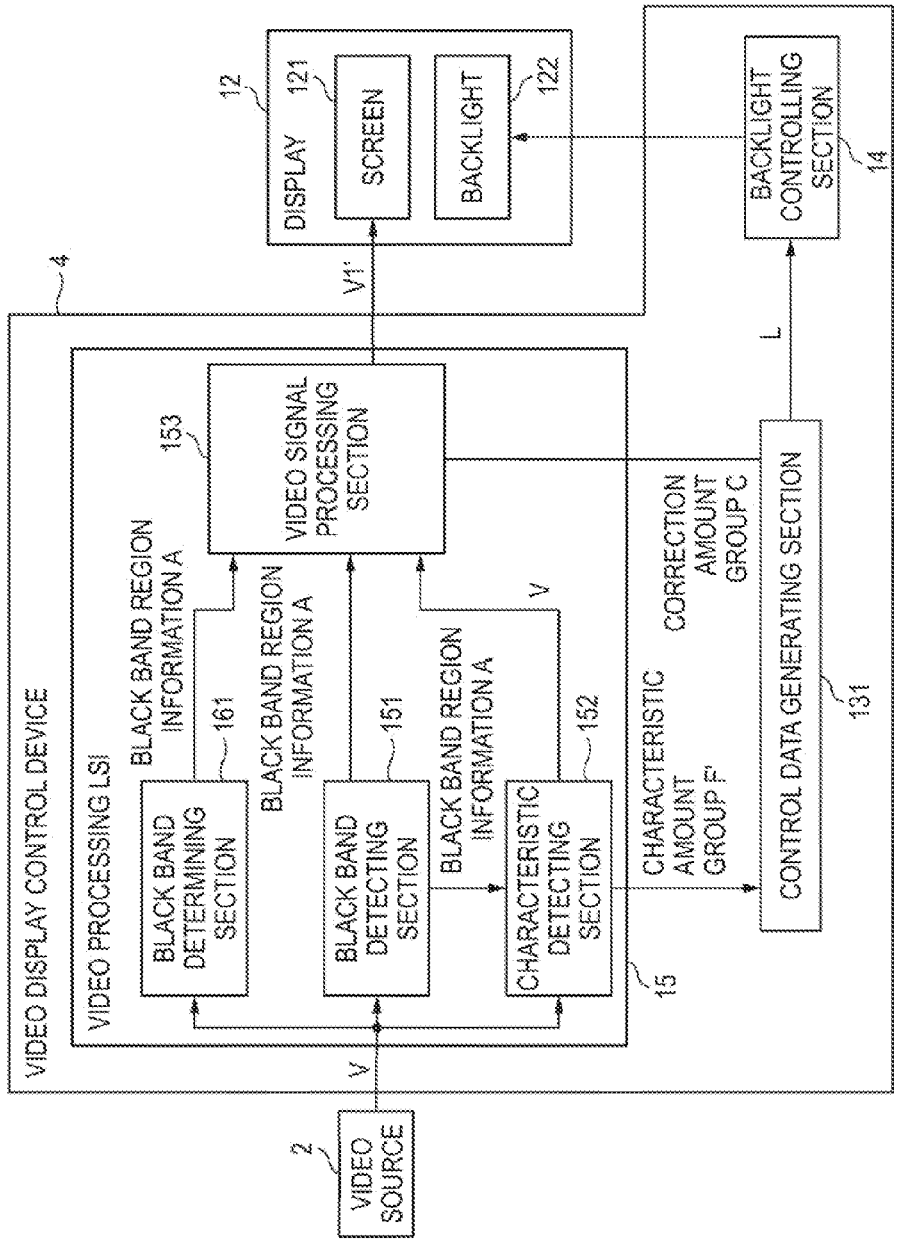
FIG. 12 is a block diagram showing an example of a video display control device and its peripheral structure in a modification of the second embodiment of the present invention.
Figure 13:
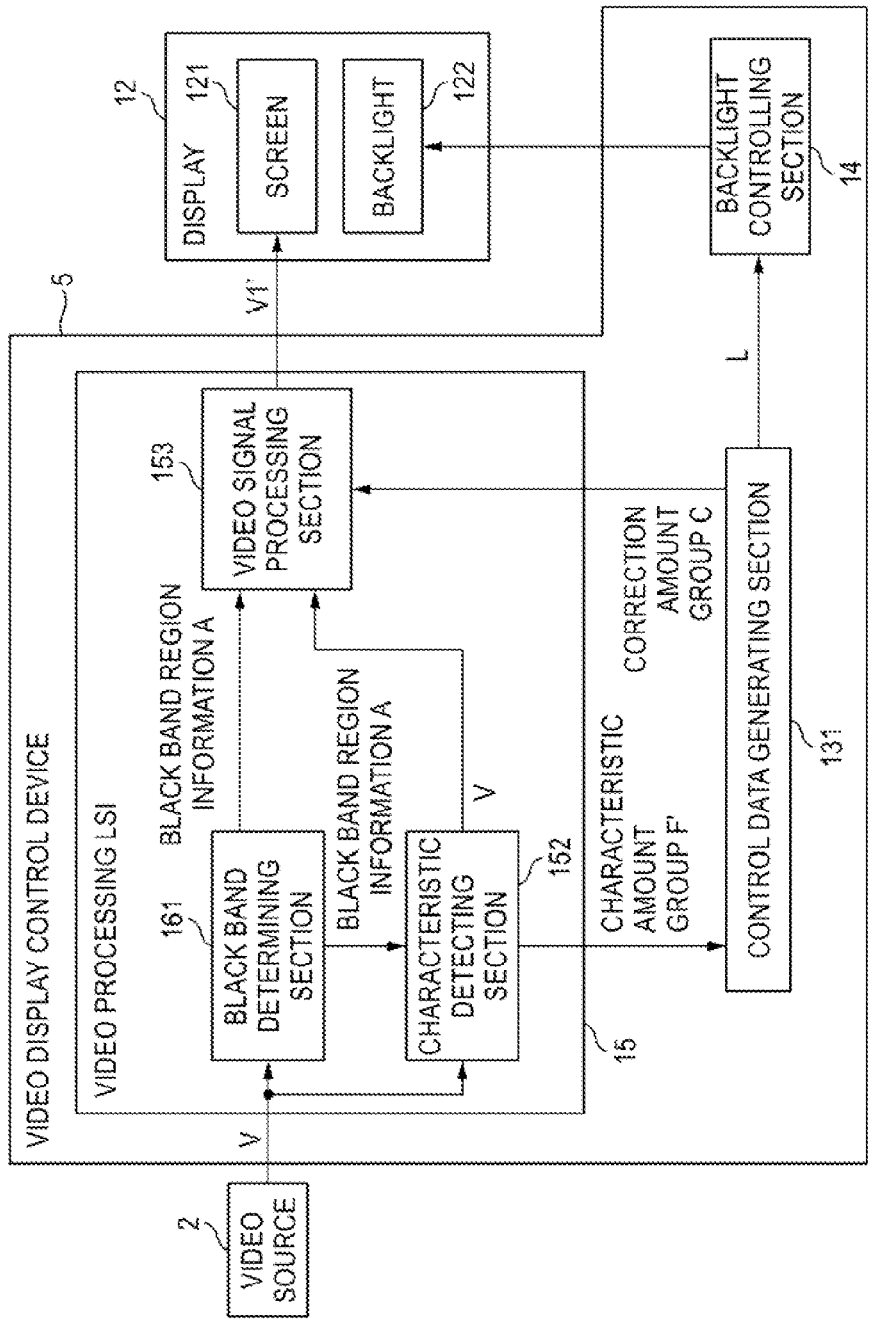
FIG. 13 is a block diagram showing another example of a video display control device and its peripheral structure in the modification of the second embodiment of the present invention.

FIG. 12 and FIG. 13 each show a block diagram showing a video display control device 4 and its peripheral structure in a modification of the second embodiment. A difference from the above-described structure is that a black band determining section 161 is used.

To the black band determining section 161, black band regions corresponding to the aspect ratio are preset, and when the video signal V is input, the black band determining section 161 determines the aspect ratio of the video signal V, and outputs the black band region information A including information on the black band regions with respect to the entire video region, to the video signal processing section 153.

Then, the characteristic detecting section 152 sets, of the video signal V input to the video display control device 4, the video signal of the region except the black band regions determined by the black band determining section 161, as the video signal of the characteristic amount detection region A4. The subsequent processing and succeeding structures are similar to the contents described in the second embodiment.

The example shown in FIG. 12 is a structure in which the black band detecting section 151 and the black band determining section 161 are connected in parallel. By adopting this structure, the black band region information A output from the black band determining section 161 can be used even if a black band region that cannot be sufficiently detected by the black band detecting section 151 is present, so that the succeeding control processing can be performed more accurately.

The example shown in FIG. 13 is a structure using the black band determining section 161 instead of the black band detecting section 151. When the video source 2 connected (or the video signal V input) to a video display control device 5 is limited and the aspect ratio of the input video signal V can be previously known, by adopting this structure, the amount of black band region extraction processing can be reduced, so that reduction in processing time can be realized.

As described above, in the second embodiment, by the characteristic detecting section 152 changing the characteristic amount detection region A4 so that the black band regions A3 are not included based on the black band region information A, the increase in value of histogram HA of region A by the black band regions A3 can be prevented.

Thereby, by increasing the rate of the value of histogram HD of region D and increasing the dynamic range of region D allocated to the other regions, power consumption at the backlight 122 can be reduced efficiently.

The above-described contents will be described in more detail by using FIG. 11(a) to FIG. 11(d). FIG. 11(a) to FIG. 11(d) are graphs showing an example of the post-correction gamma characteristic based on the value of histogram, an example of the post-correction gamma characteristic based on the value of histogram after the processing of step S30 is performed, and characteristic amount detection regions corresponding to these.

Figure 11:
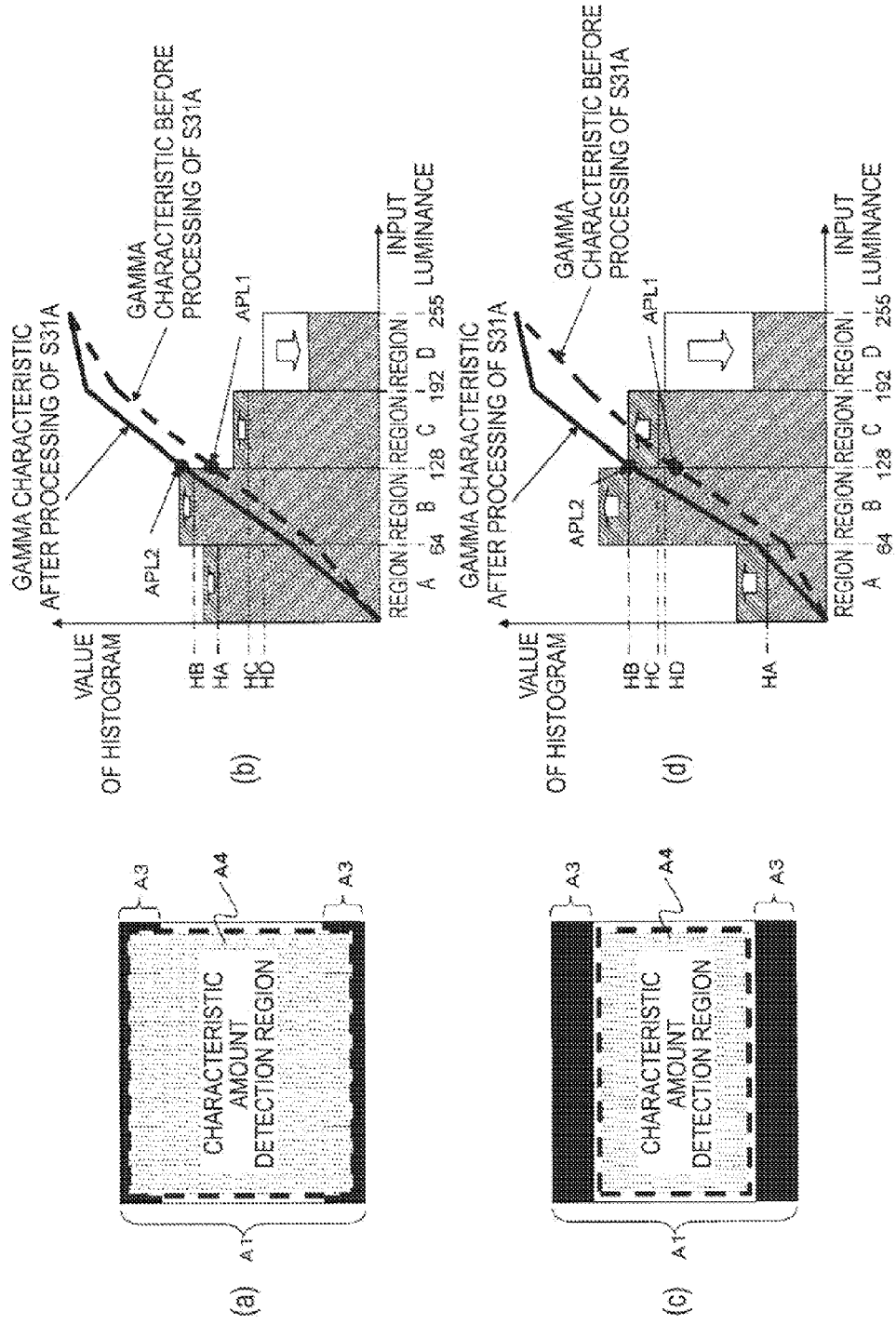
FIG. 11(a) to FIG. 11(d) are views for comparing the characteristic obtained by the first embodiment of the present invention and the characteristic obtained by the second embodiment of the present invention.

As shown in FIG. 11(a), the characteristic detecting section 111 in the first embodiment obtains the characteristic shown in FIG. 11(b) by performing the correction processing with the entire video region A1 as the characteristic amount detection region A4.

Since the characteristic detecting section 152 in the second embodiment applies the region excepting the black band regions A3 from the entire video region A1 as the characteristic amount detection region A4 as shown in FIG. 11(c), as shown in FIG. 11(d), the rate of the value of histogram HD of region D is increased, and of the dynamic range of region D, the dynamic range allocated to the other regions can be increased more than in the case of the first embodiment. Consequently, power consumption at the backlight 122 can be reduced efficiently.

Moreover, at the video signal processing section 153, by performing correction only on the video signal V excepting the black band regions A3 based on the correction amount group C, the "black" of the video signal V output from the video source 2 is displayed as it is in the black band regions A3 of the display 12 without the video signal corresponding to the black band regions A3 being corrected, so that black floating in the black band regions A3 can be prevented.

While the present invention has been described in detail with reference to specific embodiments, it is obvious to one of ordinary skill in the art that various changes and modifications are possible without departing from the spirit and scope of the present invention.

The present application is based upon Japanese Patent Application (No. 2012-021922) filed on Feb. 3, 2012, the entire contents of which are incorporated herein by reference.

INDUSTRIAL APPLICABILITY

The video display control device according to the present invention is suitable for a control device of a liquid crystal display that displays a video in accordance with a video signal, and the like.

DESCRIPTION OF REFERENCE NUMERALS AND SIGNS

1 Video display control device
11 Video processing LSI
111 Characteristic detecting section
112 Video signal processing section
12 Display
121 Screen
122 Backlight
131 Control data generating section
14 Backlight controlling section
15 Video processing LSI
151 Black band detecting section
152 Characteristic detecting section
153 Video signal processing section
161 Black band determining section
2 Video source
3, 4, 5 Video display control device
A1 Entire video region
A2 Actual video region
A3 Black band region
A4 Characteristic amount detection region

The invention claimed is:

1. A video display control device that controls displaying of a video on a display having a screen and a backlight for emitting light toward the screen, the video display control device comprising:

a black band detecting section that detects a black band region of a video signal input to the video display control device;

a characteristic detecting section that detects a mean luminance and a value of histogram related to a luminance of a video signal, corresponding to a characteristic amount detection region which is a predetermined region of the video signal input to the video display control device;

a control data generating section that generates control data for correcting the video signal based on values detected by the characteristic detecting section;

a video signal processing section that corrects the video signal based on the control data generated by the control data generating section and outputs a video signal after correction to the display; and a backlight controlling section that controls a light emission amount of the backlight based on a difference between the mean luminance of the video signal and a mean luminance of the video signal after the correction, wherein the characteristic detecting section sets a video signal of a region excepting the black band region detected by the black band detecting section, as the video signal of the characteristic amount detection region;

wherein the control data generating section generates control data for the video signal processing section to perform correction of allocating a dynamic range of a high gradation region of the video signal of the region that is set as the characteristic amount detection region, to a low gradation region of the video signal; and wherein the backlight controlling section controls a light emission luminance of the backlight so as to cancel an increase or decrease of the mean luminance of video displayed on the screen in accordance with an increase or decrease of the mean luminance of the video signal after the correction with respect to the mean luminance of the video signal.

2. The video display control device according to claim 1, wherein the characteristic detecting section makes a change so that no black band region is included in the feature detection region in accordance with black band region information from the black band detecting section.

3. The video display control device according to claim 1, wherein the control data indicates a gamma characteristic of the video signal after correction performed by the video signal processing section, the gamma characteristic being determined in accordance with a relative magnitude of a value of a histogram of the high gradation region and the value of the histogram of the low gradation region; and wherein the gamma characteristic of the video signal after the correction has a feature that the slope of the region of which the value of the histogram is relatively large, is made larger than the other.

4. The video display control device according to claim 1, wherein in correction of allocating the dynamic range of the high gradation region to the low gradation region, the control data generating section determines an amount or a rate of the dynamic range of the high gradation region allocated to the low gradation region in accordance with the value of the histogram of the high gradation region.

5. The video display control device according to claim 4, wherein in the correction of allocating the dynamic range of the high gradation region to the low gradation region, the control data generating section increases an amount or a rate of the dynamic range allocated to the low luminance region in a case that the value of the histogram of the high gradation region is smaller than a first threshold value, and decreases the amount or the rate of the dynamic range allocated to the low gradation region in a case that the value of the histogram of the high gradation region is larger than a second threshold value.

6. The video display control device according to claim 5, wherein the control data generating section decreases the more the amount or the rate of the dynamic range allocated to the low gradation region in accordance with a magnitude of the value of the histogram of the high gradation region, in a case that the value of the histogram of the high gradation region is larger than the first threshold and is smaller than the second threshold value.

7. The video display control device according to claim 1, wherein the video signal processing section performs no correction on the black band region in accordance with black band region information from the black band detecting section.

8. Video display control device that controls displaying of a video on a display having a screen and a backlight for emitting light toward the screen, the video display control device comprising:

a black band determining section that determines a black band region of a video signal input to the video display control device;

a characteristic detecting section that detects a mean luminance and a value of histogram related to a luminance of a video signal, corresponding to a characteristic amount detection region which is a predetermined region of the video signal input to the video display control device;

a control data generating section that generates control data for correcting the video signal based on values detected by the characteristic detecting section;

a video signal processing section that corrects the video signal based on the control data generated by the control data generating section and outputs a video signal after correction to the display; and a backlight controlling section that controls a light emission amount of the backlight based on a difference between the mean luminance of the video signal and a mean luminance of the video signal after the correction, wherein the characteristic detecting section sets a video signal of a region excepting the black band region determined by the black band determining section of the video signal input to the video display control device, as the video signal of the characteristic amount detection region;

wherein the control data generating section generates control data for the video signal processing section to perform correction of allocating a dynamic range of a high gradation region of the video signal of the region that is set as the characteristic amount detection region to a low gradation region of the video signal; and wherein the backlight controlling section controls a light emission luminance of the backlight so as to cancel an increase or decrease of the mean luminance of video displayed on the screen in accordance with an increase or decrease of the mean luminance of the video signal after the correction with respect to the mean luminance of the video signal.

* * * * *